3,501,531
HYDROFORMYLATION PROCESS
Geoffrey Wilkinson, London, England, assignor to Ethyl Corporation, New York, N.Y., a corporation of Virginia
No Drawing. Filed Dec. 15, 1965, Ser. No. 514,132
Claims priority, application Great Britain, Dec. 15, 1964, 50,983/64
Int. Cl. C07c 45/02
U.S. Cl. 260—604     6 Claims

ABSTRACT OF THE DISCLOSURE

A process for preparing aldehydes and alcohols is disclosed. This process comprises reacting an olefin with carbon monoxide and hydrogen, featuring the use of a rhodium/tin/halide complex in a non-reactive solvent as the catalyst.

---

This invention relates to new compounds and their use as catalysts in hydroformylation procedures.

The hydroformylation, or oxo, process is well known and comprises the preparation of an aldhehyde by combining an olefin with carbon monoxide and hydrogen in the presence of a cobalt or nickel-containing catalyst. In many instances the hydrogen and carbon monoxide is in the form of synthesis gas. The reaction can be considered as equivalent to an addition of formaldehyde across the double bond of an olefin. The aldehyde which is produced can be reduced to the corresponding alcohol either concurrently with the oxo step or in a second reaction stage.

Prior art hydroformylation reactions mainly employ heterogeneous catalysts such as nickel and cobalt carbonyls. A preferred prior art catalyst is dicobalt octocarbonyl. The use of such catalysts often requires the use of elevated pressures and temperatures and in many instances the catalyst is readily poisoned, probably because the catalytic effect is a surface phenomenon which is inhibited by the absorption of impurities upon the catalyst surface. There has existed a need for a catalyst which is homogeneous with the reaction mixture and which will permit hydroformylation reactions to be carried out as moderate temperatures and pressures. This invention satisfies these needs.

This invention satisfies its objects, namely the provision of chemical compounds which are soluble in a reaction medium and when employed in solution catalyze the hydroformylation reaction.

In a preferred embodiment, the catalysts of this invention have the formula

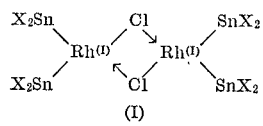

(I)

wherein X is a halogen having an atomic number of at least 17 and not more than 53. In an embodiment of this invention the compounds illustrated by the structural formula above are used as catalysts in the oxo reaction. Hence a preferred embodiment of this invention comprises a hydroformylation process, said process comprising reacting hydrogen and carbon monoxide with a straight chain terminal monolefin having from 2 to about 24 carbon atoms, said olefin being solely composed of carbon and hydrogen; said process being carried out in the presence of solvent quantities of a monohydric alcohol having from 1 to 4 carbon atoms, at a temperature within the range of about 50° to about 150° C., at a hydrogen pressure within the range of from about 30 to about 60 atmospheres, a carbon monoxide pressure within the range of from about 40 to about 70 atmospheres, said process being carried out in the presence of a catalytic quantity of a compound having the structural formula above.

The catalytic compounds of this invention are prepared by reacting a stannous halide with a rhodium trihalide. The reaction is readily carried out by efficiently contacting the reactants. A solvent is preferred since its use affords a smooth reaction rate and facilitates contacting the reactants. The solvent can be any inert material, in other words, the exact nature of the solvent is not critical and it is only necessary that it not react with either the product or the reactants to produce a deleterious side reaction. Typically, the solvent is a lower alkanol, preferably a monohydric alcohol having from 1 to 4 carbon atoms. Illustrative but not limiting examples of alcohols of this type are ethanol, methanol, n-propanol, isopropanol, n-butanol and the like. Ethers, such as diethyl ether or tetrahydrofuran are also suitable solvents, as is dilute hydrochloric acid, that is hydrochloric acid having a concentration not greater than 4 molar.

The stannous halide which is employed is a chloride, bromide or iodide. Preferably the chloride or bromide are used and more preferably the chloride. Similarly rhodium trichloride, rhodium tribromide and rhodium triiodide are used to produce the novel compounds of this invention. The chloride and bromide compounds are more preferred because they are more readily available. The rhodium compound may be in a hydrated form and for economic reasons the preferred rhodium reactant is rhodium trichloride monohydrate.

The process for the preparation of the compounds of this invention involves reduction of rhodium from the tripositive to the uni-positive valence state. Accordingly, three molecular portions of the stannous halide are required to form the complexes of this invention, one portion acting as reducing agent for the rhodium. Greater amounts of stannous reactant can be used if desired. There is no real upper limit in the amount of stannous reactant employed, generally, the upper limit is solely defined by economics. In most instances the reaction proceeds well if from 3 to 10 molecular proportions of stannous halide are used for each molecular portion of the rhodium trihalide reacted.

In most instances the catalytic compounds of this invention are soluble in the solvent employed. They can be used as catalysts for the hydroformylation procedure after subsequent separation from the reaction solvent. However, it is not necessary to do so and a mixture of the compound in the reaction solvent can be employed as the oxo catalyst-reaction medium.

The process for the preparation of the catalytic compositions of the invention proceeds well as mild temperatures. In general, temperatures within the range from about 10 to about 50° C. can be used although higher and lower temperatures can be employed if desired. Ambient temperatures are conveniently employed.

The process proceeds well at ambient pressures, however, higher and lower pressures can be used if desired. Elevated pressures are efficacious if it is desired to employ a reaction temperature above the normal boiling point of the solvent used.

The reaction time is not a truly independent variable and is dependent at least to some extent on the other reactants used and the inherent reactivity of the reactants. In general, higher temperatures favor the production of the compounds of this invention and correspondingly reduced reaction times are required. Usually the reaction is complete in less than about 25 hours. Reaction times in the range of less than 10 hours are preferred. In an embodiment of this invention, it is only necessary to admix the solvent, the stannous reactant, the rhodium reactant and the olefin to be hydroformylated, together with carbon monoxide and hydrogen in order to produce the corresponding aldehyde or alcoholic product. In other words this embodiment comprises the in situ formation of the novel catalyst in the oxo reaction medium. When this embodiment is used, the effective reaction time for the preparation of the catalyst is zero.

From the above discussion, it is clear to a skilled practitioner that the reaction conditions, e.g. temperature, time, pressure, nature of the solvent, etc. are not critical to the production of the catalytic compounds of this invention.

Any olefin which is known in the prior art to be susceptible to the oxo reaction can be hydroformylated using the catalytic compounds of the invention. In a preferred embodiment the olefins are terminal olefins which are solely composed of carbon and hydrogen and which have not more than about 24 carbon atoms. A highly preferred class of olefins are hydrocarbons of from about 2 to about 18 carbon atoms having only one double bond, which double bond is in the $\alpha$ or terminal position. Straight or branched-chain olefins of this type can be employed as well as mixtures thereof. Straight-chain olefins are preferred.

The reaction in which an olefinic bond is hydroformylated proceeds according to the equation

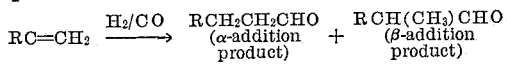

In general, the addition of the elements of formaldehyde to olefinic double bond yields the $\alpha$ product, that is, an anti-Markownikow addition. However, a little $\beta$ product also occurs in many instances. Hence, the product is usually a mixture of isomeric aldehydes, but this is often no real disadvantage as the mixture may often be used as such, for example, in the production of plasticizers where mixed compounds are not disadvantageous. Alternatively, the mixture of products may be separated.

The aldehydes which result from the above-described hydroformylation reaction may be conveniently subjected to a hydrogenation reaction wherein the aldehydes are reduced, that is, hydrogenated to the corresponding alcohol. In such hydrogenation reactions, the same complex catalysts used in the hydroformylation reaction can be employed. In many instances, the subsequent hydrogenation is favored by higher reaction temperatures. Such a 2-step process, particularly when the same complex catalyst is employed in each step, provides a convenient synthetic route for obtaining tridecyl alcohol from dodecane-1, nonanols from the corresponding octenes and heptanol from hexene-1.

Alternatively, the 2-step reaction using the complex catalyst in each step is conveniently carried out as a single reaction sequence using reaction temperatures from 90 to 120° C. and prolonged duration so that hydrogenation can take place after hydroformylation. The hydroformylation reaction of this invention can be carried out at temperatures within the range of about 50° to about 150° C. As stated above, higher temperatures viz., those within the range of 90 to about 150° C. favor the successive reduction of the aldehyde produced to the alcohol.

Usually, the hydroformylation process of this invention is carried out under superatmospheric pressures. In general, the hydrogen pressure is within the range of from about 20 to 80 atmospheres while the range 30 to 60 is preferred. Similarly, the carbon monoxide pressure is usually 20 to 80 atmospheres with the range 40 to 70 being preferred. Lower pressures of carbon monoxide and hydrogen, down to about 5 atmospheres can be used.

The reaction temperatures and pressures employed in the hydroformylation reaction of this invention are not critical variables it being only necessary to employ those reaction conditions which afford a reasonable yield of desired product in a suitable reaction time. In general, reaction times of within the range of from about 10 to about 40 hours are used and in many instances 12 to 18 hours is sufficient. It is preferred that the conditions should be such that the reaction mixture remains liquid throughout the course of the reaction and autogenous pressures are therefore conveniently employed. The progress of the reaction can be followed in the normal way by observing the consumption of the hydrogen and/or carbon monoxide.

The amount of catalyst present in the reaction system does not appear to be critical but an amount of from 0.1 to 5 percent by weight, preferably 0.5 to 3 percent by weight of the unsaturated organic compound is conveniently employed.

When the reaction is complete, the product is separated from the reaction mixture usually by fractional distillation. This may be carried out conveniently using reduced pressures. It is preferred that the separation be not carried out in such a manner as to remove all the solvent from the complex. When some solvent remains in the reaction vessel the residual catalyst-solvent mixture may then be reused in a future process of the invention, often after adding an additional quantity of solvent.

The following examples wherein all parts are by weight unless otherwise indicated serve to illustrate the process of this invention.

EXAMPLE 1

A catalyst having the structure of Formula I wherein X is chlorine is prepared by dissolving rhodium trichloride trihydrate (0.25 gram) and stannous chloride (0.54 gram) in 20 ml. of ethanol. To this catalyst solvent system is added 8 ml. of hexene-1. The resultant reaction mixture is then heated in an autoclave at 65° C. for 12 hours under a pressure of 40 atmospheres and a carbon monoxide pressure of 60 atmospheres. Separation of the reaction products by fractional distillation yields n-heptaldehyde (40 percent yield) and 2-methylcaproic aldehyde (25 percent yield).

EXAMPLE 2

The complex having Formula I wherein X is chlorine is prepared by dissolving rhodium trichloride trihydrate (0.125 gram) and stannous chloride (0.27 gram) in 4 ml. of ethanol. To this solution 4 ml. of octene-1 is added and the mixture heated in an autoclave at 65° C. for 16 hours using a hydrogen pressure of 40 atmospheres and a carbon monoxide pressure of 50 atmospheres. Distillation of the resulting solution yielded a mixture of $C_9$-aldehydes in a total yield of approximately 50 percent.

EXAMPLE 3

The process of Example 1 is repeated using 10 ml. of hexene-1, a reaction temperature of 90° C. for 16 hours, a hydrogen pressure of 30 atmospheres and a carbon monoxide pressure of 45 atmospheres. Under other conditions of higher temperature and increased reaction duration, a successive 2-step hydroformylation-hydrogenation reaction occurs and there is obtained n-heptanol (30 percent yield) and 2-methylhexanol (15 percent yield).

EXAMPLE 4

A catalyst having the structure of Formula I wherein X is bromine is prepared by reacting 3 moles of stannous bromide with 1 mole of bromine tribromide in isopropanol solvent, thereafter ethylene is hydroformylated with hydrogen using a reaction temperature of 150° C. and a total pressure of 3,000 pounds. A mixture of propionaldehyde and propanol is prepared.

EXAMPLE 5

Following the procedure of Example 2 a $C_{12}$ olefin fraction consisting of propylene tetramer is hydroformylated and a mixture of $C_{13}$ aldehydes and alcohols is produced.

EXAMPLE 6

A mixture of heptylenes is produced by copolymerization of propylene and isobutylene with a phosphoric acid catalyst and fraction of the resulting mixed polymer to obtain a fraction boiling between 76 and 99° C. The fraction is hydroformylated using the catalyst and process of Example 1. After 24 hours a mixture of $C_8$ alcohols useful in the manufacture of plasticizers is obtained. The chief alcohol present is 3,5-dimethylhexanol along with substantial quantities of 4,5-dimethylhexanol, 3,5-dimethylhexanol, 3,5-dimethylhexanol, 3-methylheptanol and 4-methylheptanol.

EXAMPLE 7

Eicosene-1 is hydroformylated using the catalyst of Example 1 to produce a mixture of the $\alpha$ and $\beta$ aldehydes. The reaction temperature is 58° C., the reaction time 24 hours, the pressures being 40 atmospheres of hydrogen and 70 atmospheres of carbon monoxide. Similar results are obtained when n-tetracosene-1 is used in the process to prepare the corresponding aldehydes derivable therefrom.

The above illustrative examples can be extended to produce hydroformylation and/or hydroformylation-hydrogenation products from butene-1, octene-1, higher olefins produced by the thermal cracking of paraffin wax, dienes such as butadiene (when only one of the double bonds reacts) and substituted olefins such as allyl alcohol, methallyl alcohol, styrene, cyclohexene and cyclooctene.

In many instances, the hydroformylation products (and alcohols derivable therefrom) produced by the process of this invention are known compounds and they have the many utilities known for them. For example, the aldehydes having from 8 to about 13 carbon atoms can be reduced to the corresponding alcohols which are useful as plasticizers. Lower alcohols derivable from the hydroformulation products of olefins having from about 2 to 5 carbon atoms are useful as fuel blending agents. These materials are also useful as solvents and as chemical intermediates.

This invention can be extended to the preparation of compounds which are analogous to those of Formula I which are produced by the reaction of germanium (II) halides with rhodium trihalides. Similar compounds can also be prepared by substitution of the rhodium trihalide with iridium halides to form the corresponding iridium-stannous or iridium-germanium compounds. The compounds of germanium and iridium are also useful as hydroformulation catalysts as discussed above.

Having fully described the novel compounds and preparation of this invention and the utility thereof, it is desired that this invention be limited only by the lawful scope of the appended claims.

I claim:
1. A process for preparing aldehydes and alcohols, said process comprising reacting carbon monoxide and hydrogen with a straight chain terminal monoolefin of from 2 to about 24 carbon atoms which is solely composed of carbon and hydrogen; said process being carried out in the presence of solvent quantities of an alkanol having from 1 to 4 carbon atoms, at a temperature within the range of about 50° to about 150° C. at a hydrogen pressure within the range of from about 30 to about 60 atmospheres, a carbon monoxide pressure within the range of from about 40 to about 70 atmospheres; and in the presence of a catalytic quantity of a compound having the formula

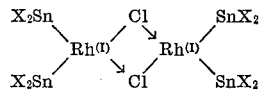

wherein X is a halogen having an atomic number of at least 17 and not more than 53.

2. A process of claim 1 wherein X is chlorine and said olefin is hexene-1.

3. A process of claim 2 wherein X is chlorine and said olefin is octene-1.

4. The process of claim 1 wherein said halogen is chlorine.

5. The process of claim 1 wherein said monoolefin has from 2 to about 18 carbon atoms.

6. The process of claim 1 wherein said alkanol is ethanol.

References Cited

UNITED STATES PATENTS 2,880,241   3/1959   Hughes.

LEON ZITVER, Primary Examiner

R. H. LILES, Assistant Examiner

U.S. Cl. X.R.

252—441; 260—598, 599, 617, 618, 632

PO-1050
(5/69)

UNITED STATES PATENT OFFICE
CERTIFICATE OF CORRECTION

Patent No. 3,501,531      Dated March 17, 1970

Inventor(s) Geoffrey Wilkinson

It is certified that error appears in the above-identified patent and that said Letters Patent are hereby corrected as shown below:

Column 1, line 42, the word "as" should be -- at --.
Claim 1, Column 6, lines 19-23, that portion of the formula reading:

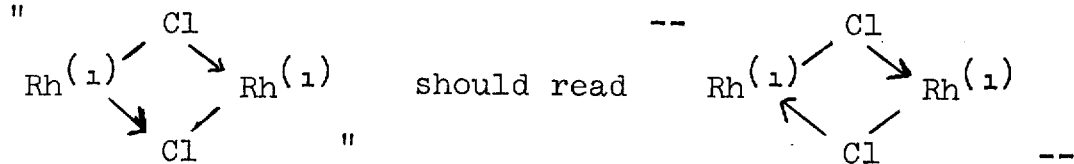

SIGNED AND
SEALED

JUL 14 1970

(SEAL)
Attest:

Edward M. Fletcher, Jr.
Attesting Officer

WILLIAM E. SCHUYLER, JR.
Commissioner of Patents